(12) United States Patent
Rodriguez et al.

(10) Patent No.: US 10,240,701 B2
(45) Date of Patent: Mar. 26, 2019

(54) HOSE COUPLER FOR TRANSFERRING FLUIDS FROM A MACHINE

(71) Applicant: Caterpillar Inc., Peoria, IL (US)

(72) Inventors: Javier A. Rodriguez, Peoria, IL (US); Bryant Alan Morris, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 31 days.

(21) Appl. No.: 15/422,942

(22) Filed: Feb. 2, 2017

(65) Prior Publication Data

US 2018/0216769 A1    Aug. 2, 2018

(51) Int. Cl.
*F16L 37/098* (2006.01)
*B01D 1/00* (2006.01)
*F16L 33/00* (2006.01)

(52) U.S. Cl.
CPC ......... *F16L 37/0985* (2013.01); *F16L 37/098* (2013.01); *B01D 1/00* (2013.01); *F16L 33/00* (2013.01)

(58) Field of Classification Search
CPC ..... F16L 37/0985; F16L 37/133; F16L 41/08; F16L 41/12; B60K 2015/03467; B60K 2015/0461; B60K 2015/0477; B60K 15/04; Y10T 137/86372
USPC .................. 285/136.1, 194, 93, 319; 137/511
See application file for complete search history.

(56) References Cited

U.S. PATENT DOCUMENTS

| | | | |
|---|---|---|---|
| 4,855,041 A | 8/1989 | Church et al. | |
| 5,496,074 A * | 3/1996 | Viratelle | F16L 37/0985 285/319 X |
| 5,609,370 A * | 3/1997 | Szabo | F16L 37/0985 285/319 |
| 6,240,957 B1 * | 6/2001 | Hattori | B60K 15/04 |
| 8,662,543 B2 * | 3/2014 | Lechner | 285/319 X |
| 9,151,424 B2 | 10/2015 | Allott et al. | |

* cited by examiner

*Primary Examiner* — Greg Binda
*Assistant Examiner* — Zachary T Dragicevich
(74) *Attorney, Agent, or Firm* — Finnegan, Henderson, Farabow, Garrett & Dunner, LLP

(57) ABSTRACT

A hose coupler includes a coupler body. The coupler body may extend from a proximal end to a distal end. The hose coupler may have a coupler bore extending through a length of the coupler body. The hose coupler may also have a flange disposed adjacent the distal end. The flange may project radially from the coupler body. The hose coupler may have a pair of tabs. The tabs may extend from the flange towards the proximal end of the coupler body.

6 Claims, 8 Drawing Sheets

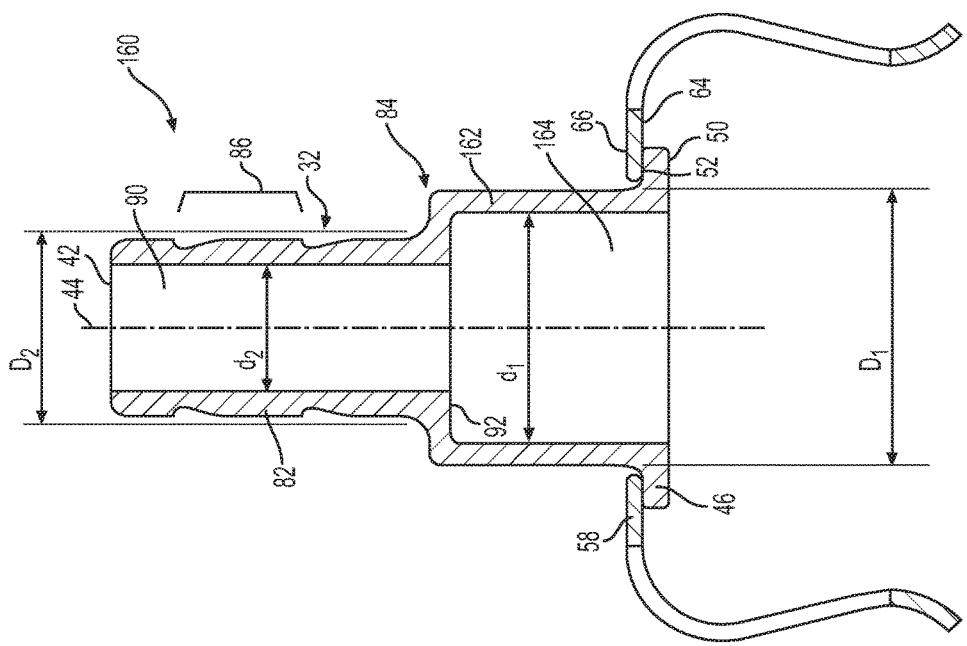
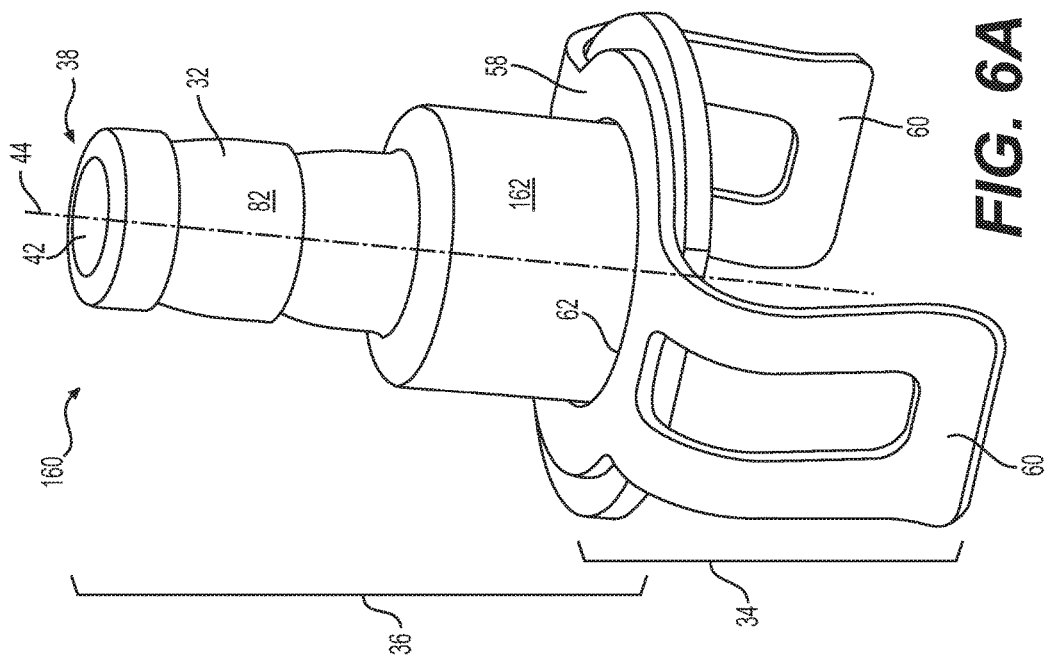

HOSE COUPLER FOR TRANSFERRING FLUIDS FROM A MACHINE

TECHNICAL FIELD

The present disclosure relates generally to a hose coupler, more particularly, to a hose coupler for transferring fluids from a machine.

BACKGROUND

An industrial machine, for example, excavator, shovel, continuous miner, loader, truck, etc., includes an engine that provides power for propelling the machine and for operation of one or more work tools of the machine. The fuel supplied to the engine often passes through a filter system that traps and removes particulates and/or water in the fuel. It is necessary to periodically drain the water accumulated in the filter system. It may also sometimes be necessary to drain the fuel from a tank or from other components associated with the engine, for example, to facilitate maintenance or repairs on the engine.

Operation of the engine and/or the machine also requires a variety of fluids other than fuel. For example, the engine requires engine lubricant for lubrication of its moving parts, and coolant to cool various engine components. Likewise the machine may require transmission fluid to lubricate components of a transmission connecting the engine with wheels or tracked undercarriages of the machine, brake fluid to activate brakes on the wheels, and/or hydraulic fluid to actuate work tools associated with the machine etc. The fluids required for engine and/or machine operation (e.g. coolant, lubricant, transmission fluid, brake fluid, hydraulic fluid, etc.) may accumulate debris and may degrade or decompose over time. As a result one or more of these fluids may have to be periodically drained and replaced. A hose may be attached to a port of the machine to transfer the fluid from the machine into a fluid storage tank. To prevent spills or leaks, and to safely remove the fluid from the machine, it may be desirable to ensure that the drain hose does not disconnect from the port, while the fluid is being drained.

U.S. Pat. No. 9,151,424 B2 of Allott et al. issued on Oct. 6, 2015 ("the '424 patent") and discloses a connector for connecting a hose coupler to a drain knob. A hose may be attached to the hose coupler for draining fluids. The '424 patent discloses a connector that includes a baseplate. The baseplate includes an opening and an interlocking feature. The '424 patent discloses a hose coupler that includes teeth that engage with the interlocking feature in the opening to attach the hose coupler to the baseplate. The baseplate of the '424 patent also includes appendages that extend axially from the base plate. The appendages include projections that engage with surfaces of the drain knob to attach the hose to the port.

Although the '424 patent discloses a connector for connecting a hose to a port, the connector of the '424 patent may be further improved. For example, although the appendages associated with the connector of the '424 patent help to secure the hose coupler to the drain knob, mechanical forces on the hose and or the pressure of the draining fluid may still be able to dislodge the hose coupler from the drain knob. Additionally, the teeth on the hose coupler may break when subjected to strong vibrations and/or mechanical forces during assembly of the connector to the port or during fluid transfer operations.

The hose coupler of the present disclosure solves one or more of the problems set forth above and/or other problems of the prior art.

SUMMARY

In one aspect, the present disclosure is directed to a hose coupler. The house coupler may include a coupler body. The coupler body may extend from a proximal end to a distal end. The hose coupler may include a coupler bore extending through a length of the coupler body. The hose coupler may also include a flange disposed adjacent the distal end. The flange may project radially from the coupler body. The hose coupler may include at least a pair of tabs. The tabs may extend from the flange towards the proximal end of the coupler body In another aspect, the present disclosure is directed to another hose coupler. The hose coupler may include a coupler body. The coupler body may extend from a proximal end to a distal end. The hose coupler may include a coupler bore extending through a length of the coupler body. The hose coupler may include a flange disposed adjacent the distal end. The flange may extend radially from the coupler body. The hose coupler may also include at least a pair of tabs. The tabs may extend from the coupler body. The tabs may also be disposed axially offset from the flange.

In yet another aspect the present disclosure is directed to a hose coupler assembly. The hose coupler assembly may include a clip. The clip may include an opening. The hose coupler assembly may include a hose coupler disposed within the opening. The hose coupler may extend from a proximal end to a distal end. The hose coupler assembly may include a coupler bore extending through a length of the hose coupler. The hose coupler assembly may include a flange disposed adjacent the distal end. The flange may extend radially from the hose coupler. The flange may also be configured to abut on the clip.

BRIEF DESCRIPTION OF THE DRAWINGS

FIG. 6A is an illustration of yet another exemplary disclosed hose coupler assembly; and FIG. 6B is a cross-sectional view of the exemplary disclosed hose coupler assembly of FIG. 6A.

DETAILED DESCRIPTION

Figure 1:
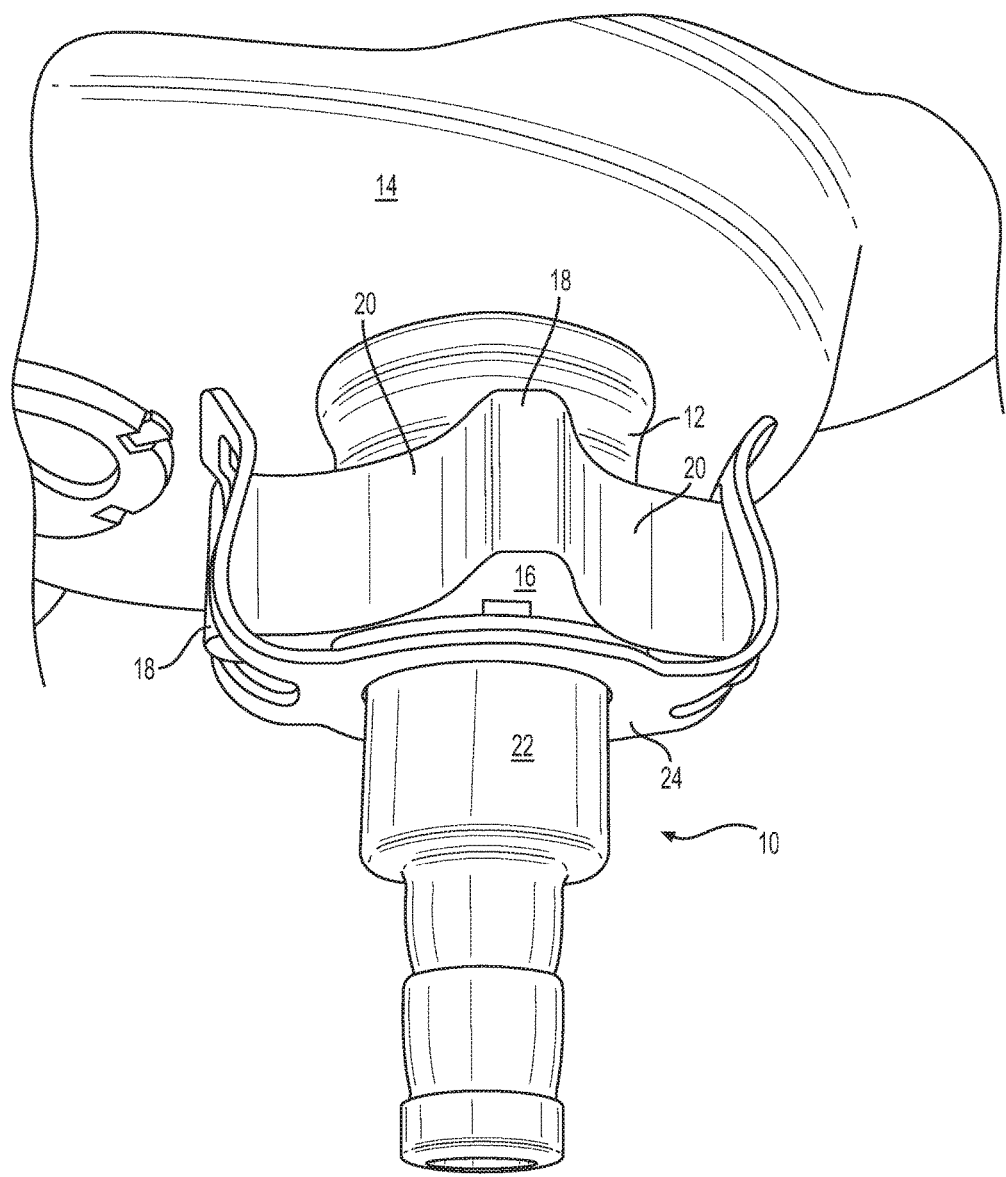
FIG. 1 is a perspective view of a hose coupler assembly connected to a port of a tank storing a fluid.

FIG. 1 illustrates an exemplary hose coupler assembly 10 connected to port 12 of tank 14, which may store a fluid associated with a machine (not shown). For example, tank 14 may store water, fuel, lubricant, coolant, transmission fluid, brake fluid, hydraulic fluid, or any other type of fluid associated with the machine. Port 12 may allow fluid stored in tank 14 to be drained from tank 14. It is also contemplated that port 12 may allow fluid to be transferred into tank 14. Port 12 may include knob 16, which may be configured to control a rate of flow of the fluid through port 12. As illustrated in the exemplary embodiment of FIG. 1, knob 16 may include projections 18 separated by recessed portions 20. Knob 16 may be rotatable in a clockwise or counter-clockwise direction to open or close port 12 to regulate the flow of fluid through port 12. Hose coupler assembly 10 may include hose coupler 22 and clip 24. In one exemplary embodiment as illustrated in FIG. 1, clip 24 may engage with projections 18 of knob 16 to attach hose coupler 22 to port 12.

Figure 2:
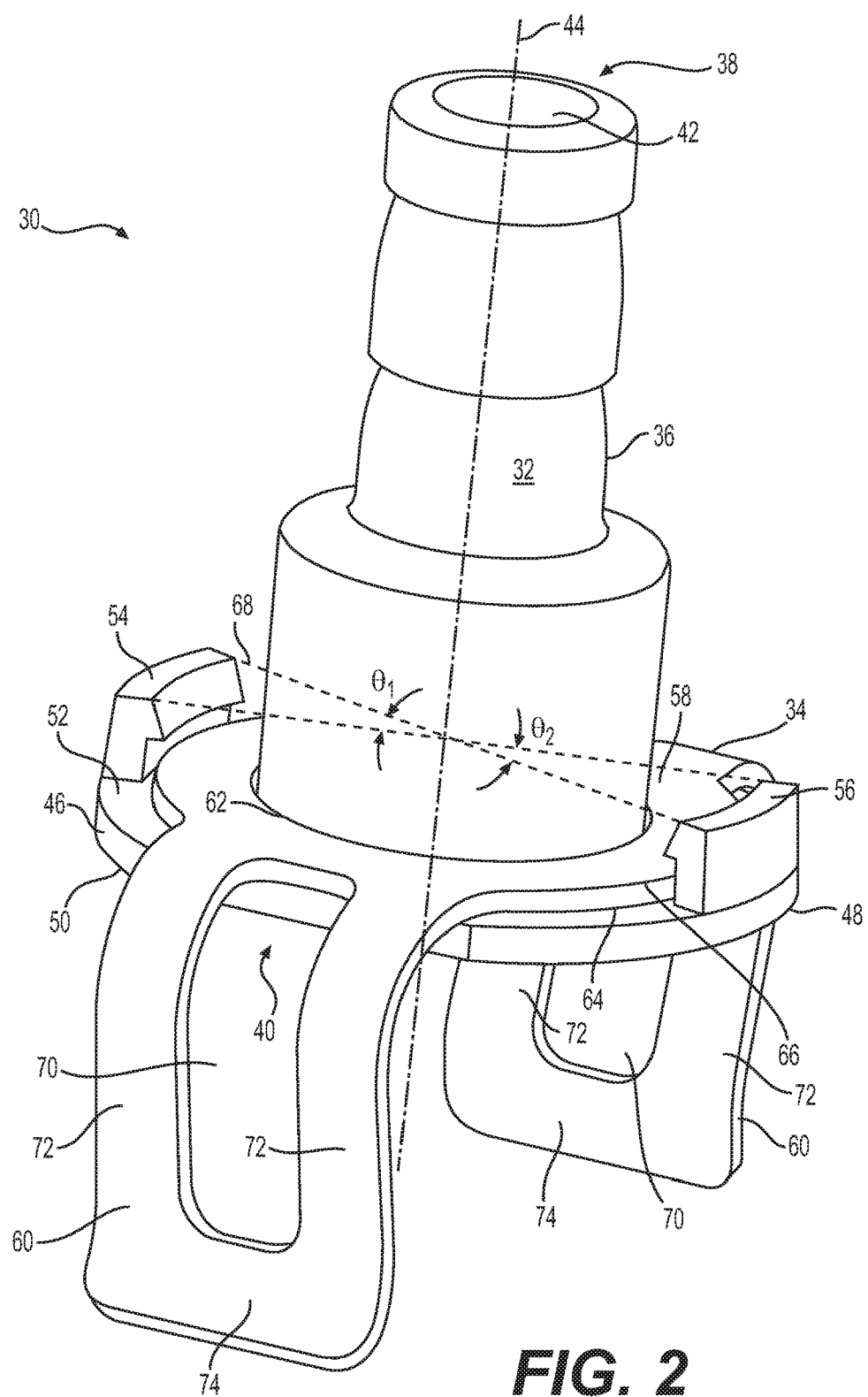
FIG. 2 is an illustration of an exemplary disclosed hose coupler assembly.

FIG. 2 illustrates an exemplary hose coupler assembly 30. Like hose coupler assembly 10, hose coupler assembly 30 may be attached to port 12 (see FIG. 1). Hose coupler assembly 30 may include hose coupler 32 and clip 34. Hose coupler 32 may include coupler body 36, which may extend from proximal end 38 to distal end 40. Coupler body 36 may include coupler bore 42, which may extend through a length of coupler body 36, from proximal end 38 to distal end 40. Coupler body 36 and coupler bore 42 may be generally concentrically disposed about longitudinal axis 44. Hose coupler 32 may include flange 46 disposed adjacent distal end 40. In one exemplary embodiment as illustrated in FIG. 2, flange 46 may project radially outward from coupler body 36 and may circumscribe coupler body 36. Flange 46 may have a generally annular shape and may be disposed generally perpendicular to longitudinal axis 44. It is contemplated, however, that flange 46 may be disposed at an angle other than about 90° relative to longitudinal axis 44. Although flange 46 has been illustrated in FIG. 2 as having a generally circular perimeter 48, it is contemplated that perimeter 48 of flange 46 may have an elliptical, triangular, square, or any type of shape known in the art.

As used in this disclosure, the terms "about" and "generally" indicate typical manufacturing tolerances and dimensional rounding. Thus, for example, generally circular or cylindrical suggests that a radius may vary within typical machining and manufacturing tolerances, for example, within ±0.1 mm. Likewise the term about suggests that an angle of inclination may vary within typical machining and manufacturing tolerances, for example, within ±1°. The phrase "generally perpendicular" as used in this disclosure suggests that the angle between two features lies within 90°±1°. Further, a surface disclosed as being generally conical may have its largest radius exceed its smallest radius by at least an order of magnitude greater than the machining or manufacturing tolerances, for example, by at least 1 mm, and/or an angle of inclination greater than 1°.

Flange 46 may include flange front face 50 and flange rear face 52 disposed opposite and axially offset from flange front face 50. Flange front face 50 may face distal end 40, and may be coplanar with distal end 40 of hose coupler 32. Flange rear face 52 may face proximal end 38. Flange 46 may include tabs 54, 56. In one exemplary embodiment as illustrated in FIG. 2, tab 54 may be disposed diametrically opposite to tab 56. It is contemplated, however, that tabs 54, 56 may not be diametrically opposite to each other. Although only two tabs 54 and 56 have been illustrated in FIG. 2, it is contemplated that flange 46 may have any number of tabs 54, 56. Each of tabs 54, 56 may extend towards proximal end 38 from flange rear face 52. In one exemplary embodiment as illustrated in FIG. 2, tabs 54 and 56 may extend generally parallel to longitudinal axis 44 and generally perpendicular to flange 46. It is contemplated, however, that tabs 54 and 56 may be inclined relative to both longitudinal axis 44 and flange 46.

Each of tabs 54 and 56 may extend circumferentially over a portion of perimeter 48 of flange 46. For example, as illustrated in FIG. 2, tab 54 may extend circumferentially over a portion of perimeter 48, spanning an angle "$\theta_1$," and tab 56 may extend over a portion of perimeter 48, spanning an angle "$\theta_2$." As illustrated in FIG. 2, angles $\theta_1$ and $\theta_2$ may be measured in a plane disposed generally perpendicular to longitudinal axis 44. Angles $\theta_1$ and $\theta_2$ of tabs 54 and 56, respectively, may be equal or unequal. In one exemplary embodiment, angles $\theta_1$ and $\theta_2$ may range between about 10° and about 20°.

Clip 34 may include clip base 58 and legs 60. Clip base 58 may be generally planar and may have a generally circular shape, although other shapes are also contemplated. Clip base 58 may have an opening 62. Hose coupler 32 may be disposed within opening 62. Opening 62 may have a size, which may be sufficiently large so that hose coupler 32 may be received in opening 62. As illustrated in FIG. 2, however, the size of opening 62 may be selected so that flange 46 may not pass through opening 62. Opening 62 may be circular, elliptical, or may have any other shape known in the art. Clip base 58 may have a base front face 64 and a base rear face 66 disposed opposite base front face 64. Base front face 64 of clip base 58 may abut flange rear face 52, while base rear face 66 may face proximal end 38. As also illustrated in FIG. 2, clip base 58 may be disposed between flange 46 and tabs 54, 56.

Legs 60 of clip 34 may extend from clip base 58 towards distal end 40 of hose coupler 32. Legs 60 may be disposed in circumferential spaces 68 between tabs 54 and 56. Each leg 60 may include slot 70. As illustrated in FIG. 2, each leg 60 may include side bars 72 attached at one end to clip base 58. Side bars 72 may be spaced apart from each other and may extend from clip base 58. Cross bar 74 may connect the free ends of side bars 72 such that slot 70 may be circumscribed by clip base 58, side bars 72, and cross bar 74. Legs 60 may have a planar or curvilinear shape and may be disposed generally perpendicular to clip base 58. It is contemplated that in some exemplary embodiments, legs 60 may be inclined to clip base 58. For example, in its disengaged configuration, a diametrical distance between cross bars 74 of legs 60 may be smaller than a diameter of clip base 58. In an engaged configuration of clip 34, slots 70 may engage with projections 18 of knob 16 (see FIG. 1) so that projections 18 may be disposed within slots 70 and between clip base 58 and cross bars 74.

Figure 3A:
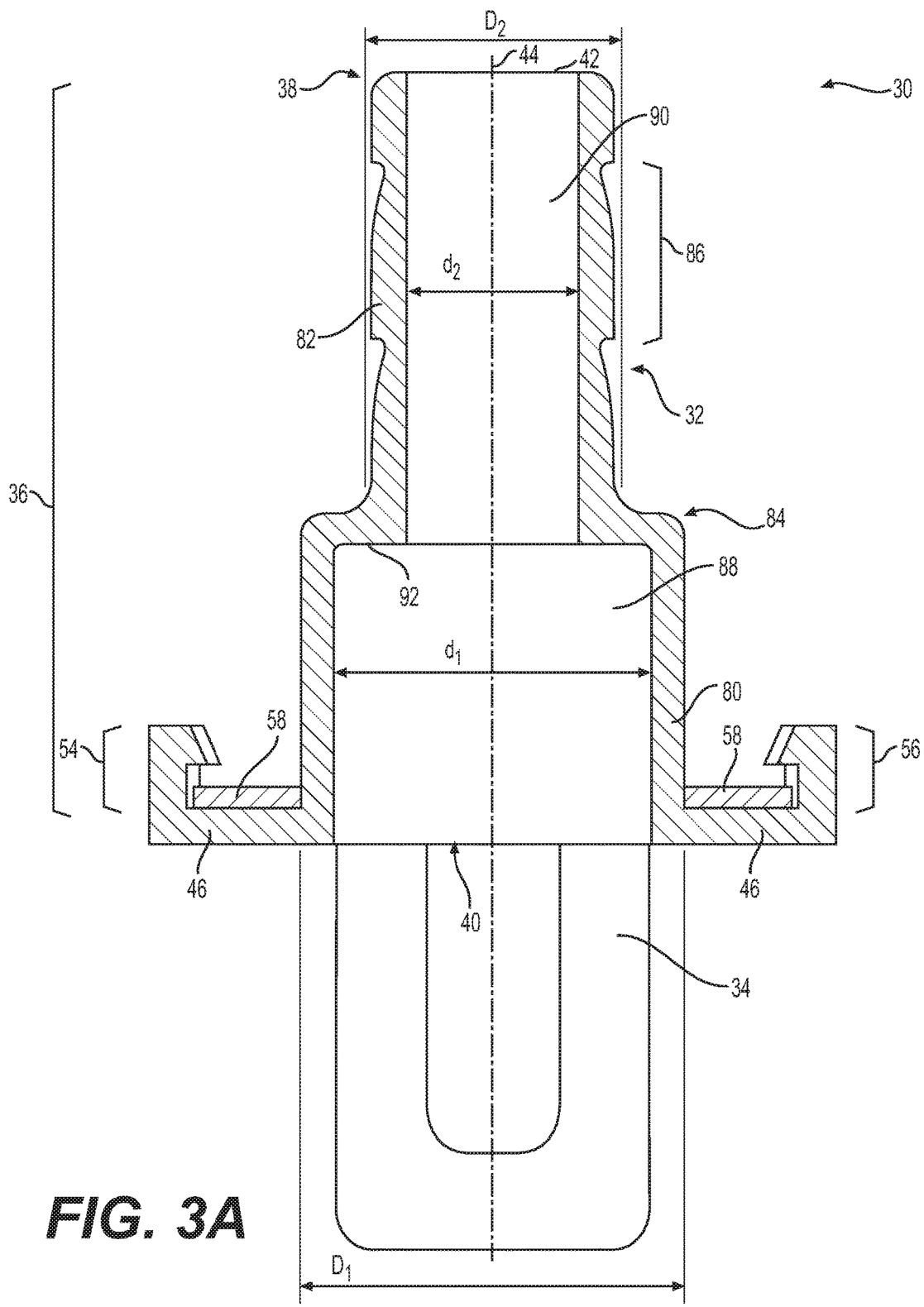
FIG. 3A is a cross-sectional view of the exemplary disclosed hose coupler assembly of FIG. 2.

FIG. 3A illustrates a cross-sectional view of hose coupler assembly 30 in a vertical plane passing through tabs 54, 56. As illustrated in FIG. 3A, coupler body 36 of hose coupler 32 may include body portion 80 and barb portion 82. Body portion 80 may extend from distal end 40 to body portion end 84 disposed between proximal end 38 and distal end 40. Body portion 80 may have a generally cylindrical shape. Barb portion 82 may extend from body portion end 84 to proximal end 38. Barb portion 82 may include one or more barb sections 86 configured to be received in a hose (not shown). Body portion 80 may have an outer diameter "$D_1$" larger than a maximum outer diameter "$D_2$" of barb portion 82.

Coupler bore 42 may include body bore portion 88 and barb bore portion 90. Body bore portion 88 may extend from distal end 40 to adjacent body portion end 84. Barb bore portion 90 may extend from body bore portion 88 to proximal end 38. In one exemplary embodiment as illustrated in FIG. 3A, an inner diameter "$d_1$" of body bore portion 88 may be larger than an inner diameter "$d_2$" of barb bore portion 90, forming seating surface 92 adjacent body portion end 84. In use, an end of port 12 (see FIG. 1) may abut against seating surface 92. It is contemplated, however, that in some exemplary embodiments, inner diameters $d_1$ and $d_2$ may be equal, eliminating seating surface 92.

Figure 3B:
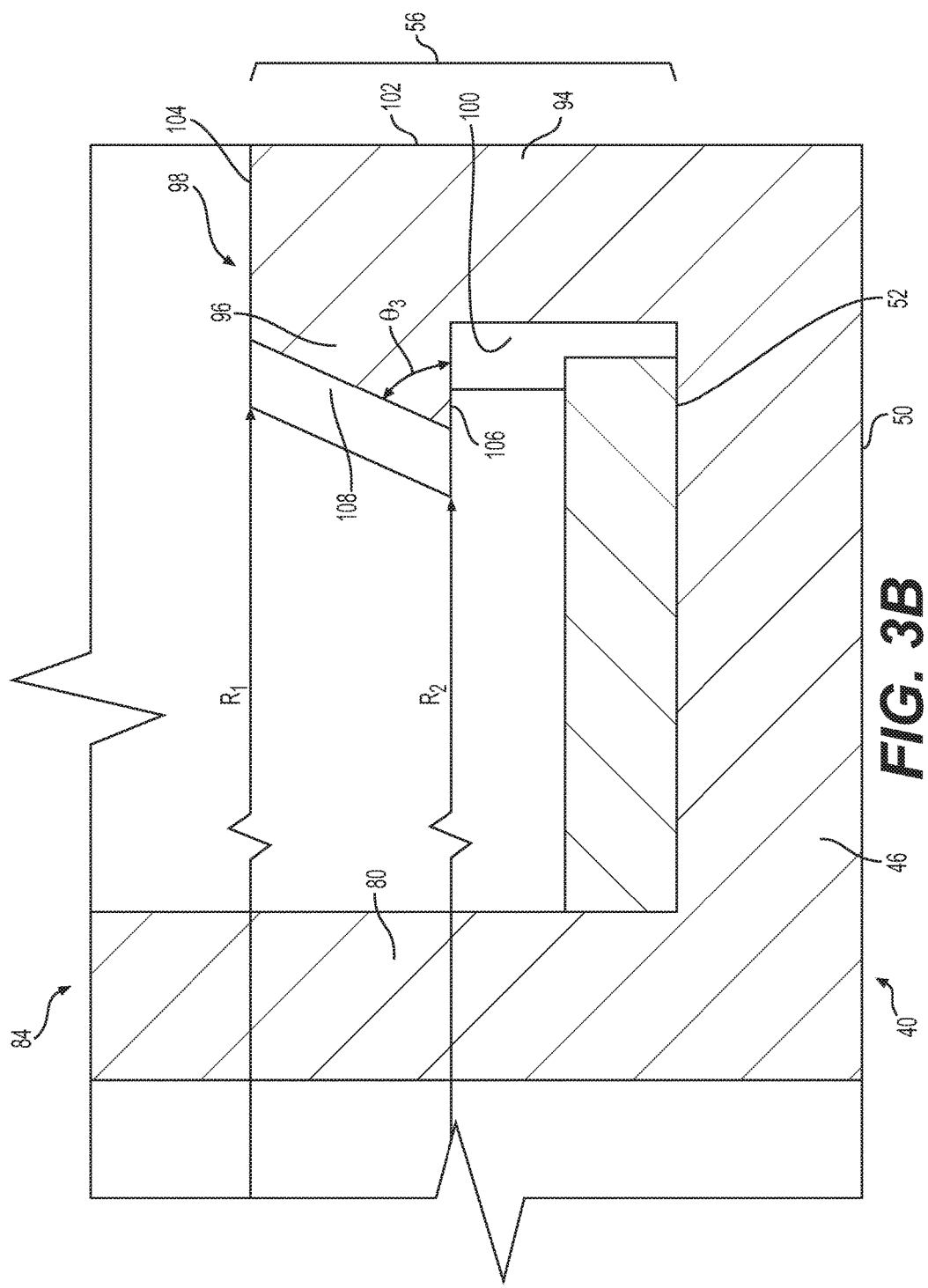
FIG. 3B is a magnified view of an exemplary disclosed tab of the hose coupler assembly of FIG. 2.

As also illustrated in FIG. 3A, tabs 54, 56 may extend axially from flange 46 towards proximal end 38. Clip base 58 of clip 34 may be disposed between flange 46 and tabs 54, 56. FIG. 3B illustrates a magnified cross-sectional view of tab 56. Tab 56 may include tab leg 94 and tab projection 96. Tab leg 94 may extend axially from flange rear face 52 to tab end 98 disposed between proximal end 38 and distal end 40. In one exemplary embodiment as illustrated in FIG. 3B, tab end 98 may be disposed between distal end 40 and body portion end 84. Tab leg 94 may have an inner surface 100 and an outer surface 102. Inner and outer surfaces 100, 102 may be generally parallel to each other or may be inclined relative to each other. In one exemplary embodiment, tab leg 94 may be disposed generally parallel to longitudinal axis 44 and may have a generally cylindrical shape. It is contemplated, however, that tab leg 94 may be inclined relative to longitudinal axis 44 so that inner and outer surfaces 100, 102 may have generally conical shapes. In one exemplary embodiment, tab leg 94 may be inclined from distal end 40 towards tab end 98, so that diameters of inner and outer surfaces 100, 102 adjacent distal end 40 may be larger than diameters of inner and outer surfaces 100, 102 adjacent tab end 98. Inclining tab leg 94 in this manner may help retain clip base 58 between flange 46 and tab projection 96. Tab leg 94 may have an annular end surface 104 at tab end 98. End surface 104 may be generally perpendicular to longitudinal axis 44.

Tab projection 96 may extend radially inwards from inner surface 100 towards body portion 80 of hose coupler 32. Tab projection 96 may include projection inner surface 106 and slanted surface 108. Projection inner surface 106 may be disposed opposite flange rear face 52, and between flange rear face 52 and tab end 98. Projection inner surface 106 may be generally parallel to flange rear face 52 and generally perpendicular to longitudinal axis 44. Slanted surface 108 may connect end surface 104 of tab leg 94 and projection inner surface 106 of tab projection 96. Slanted surface 108 may have a generally concave shape relative to longitudinal axis 44 and may be inclined relative to both end surface 104 and projection inner surface 106. In one exemplary embodiment, slanted surface 108 may have a radius "$R_1$" adjacent tab end 98, which may be greater than a radius "$R_2$" of slanted surface 108 adjacent projection inner surface 106. In another exemplary embodiment, an angle "$\theta_3$" between slanted surface 108 and end surface 104 or projection inner surface 106 may range between about 60° and about 75°. The inclination of slanted surface 108 may help clip base 58 slide over slanted surface 108 during assembly of clip 34 with hose coupler 32. Although the above description has referred to tab 56, it is contemplated that tab 54 may have similar structural features as describe above for tab 56 and may function in a manner similar to tab 56.

Figure 4:
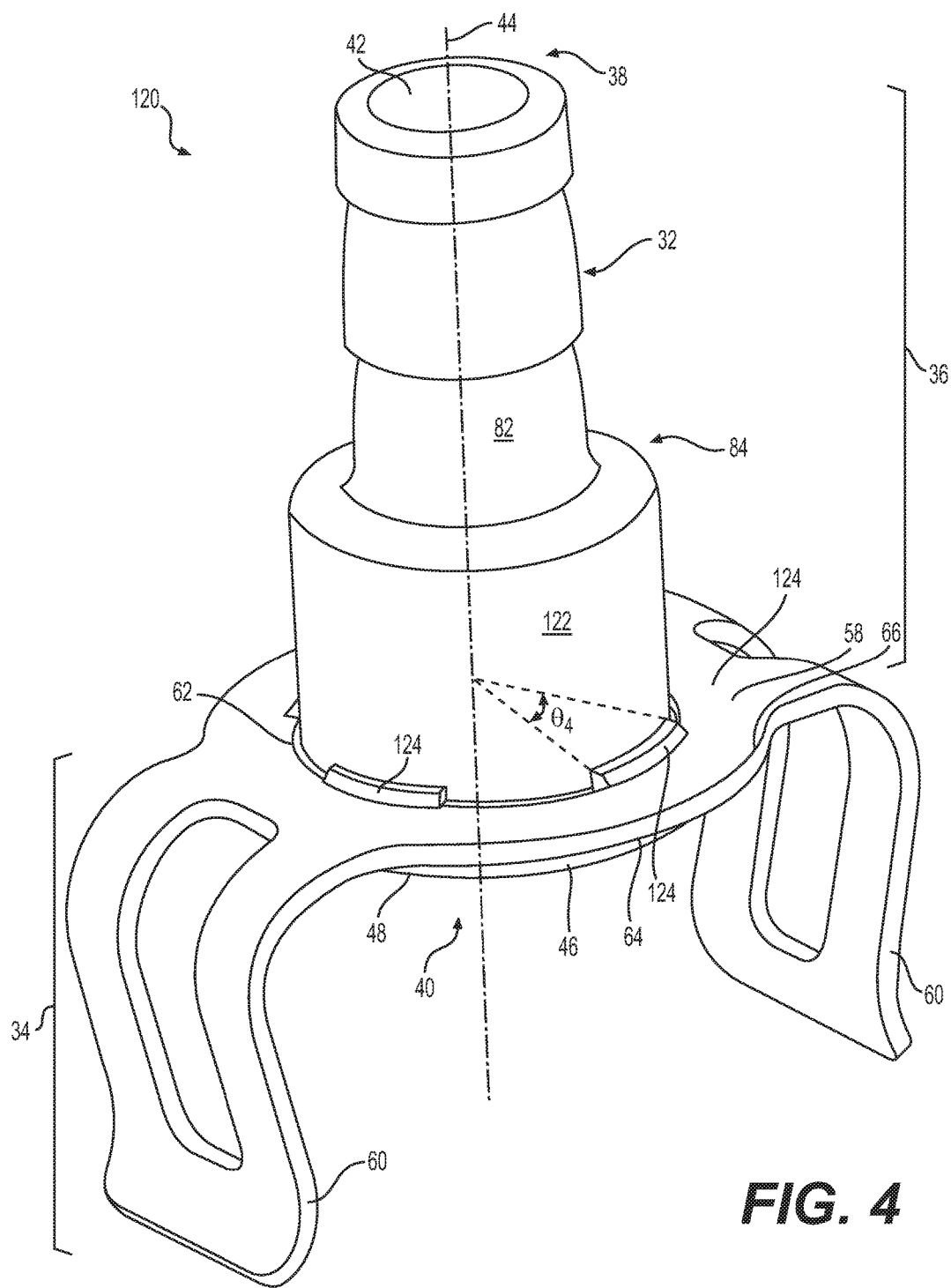
FIG. 4 is an illustration of another exemplary disclosed hose coupler assembly.

FIG. 4 illustrates another exemplary hose coupler assembly 120. Like hose coupler assembly 10, hose coupler assembly 120 may be attached to port 12 (see FIG. 1). Many of the components and features of hose coupler assembly 120 are similar to those already described with reference to hose coupler assembly 30. In the following disclosure, only those components and/or features, which may be different from hose coupler assembly 30, are described.

Hose coupler 32 of hose coupler assembly 120 may include body portion 122 and barb portion 82. Body portion 122 may extend from distal end 40 to body portion end 84 disposed between proximal end 38 and distal end 40. Body portion 122 may have a generally cylindrical shape. Barb portion 82 may extend from body portion end 84 to proximal end 38. Body portion 122 may include tabs 124. Although only two tabs 124 are seen in FIG. 4, it is contemplated that body portion 122 may include any number of tabs 124.

Tab 124 may extend over a portion of perimeter 48 of flange 46. For example, as illustrated in FIG. 4, tab 124 may extend over a portion of perimeter 48, spanning an angle "$\theta_4$." As illustrated in FIG. 4, angle $\theta_4$ may be measured in a plane disposed generally perpendicular to longitudinal axis 44. It is also contemplated that angle $\theta_4$ for different tabs 124 may be equal or unequal. In one exemplary embodiment, angle $\theta_4$ may range between about 10° and about 20°.

Figure 5A:
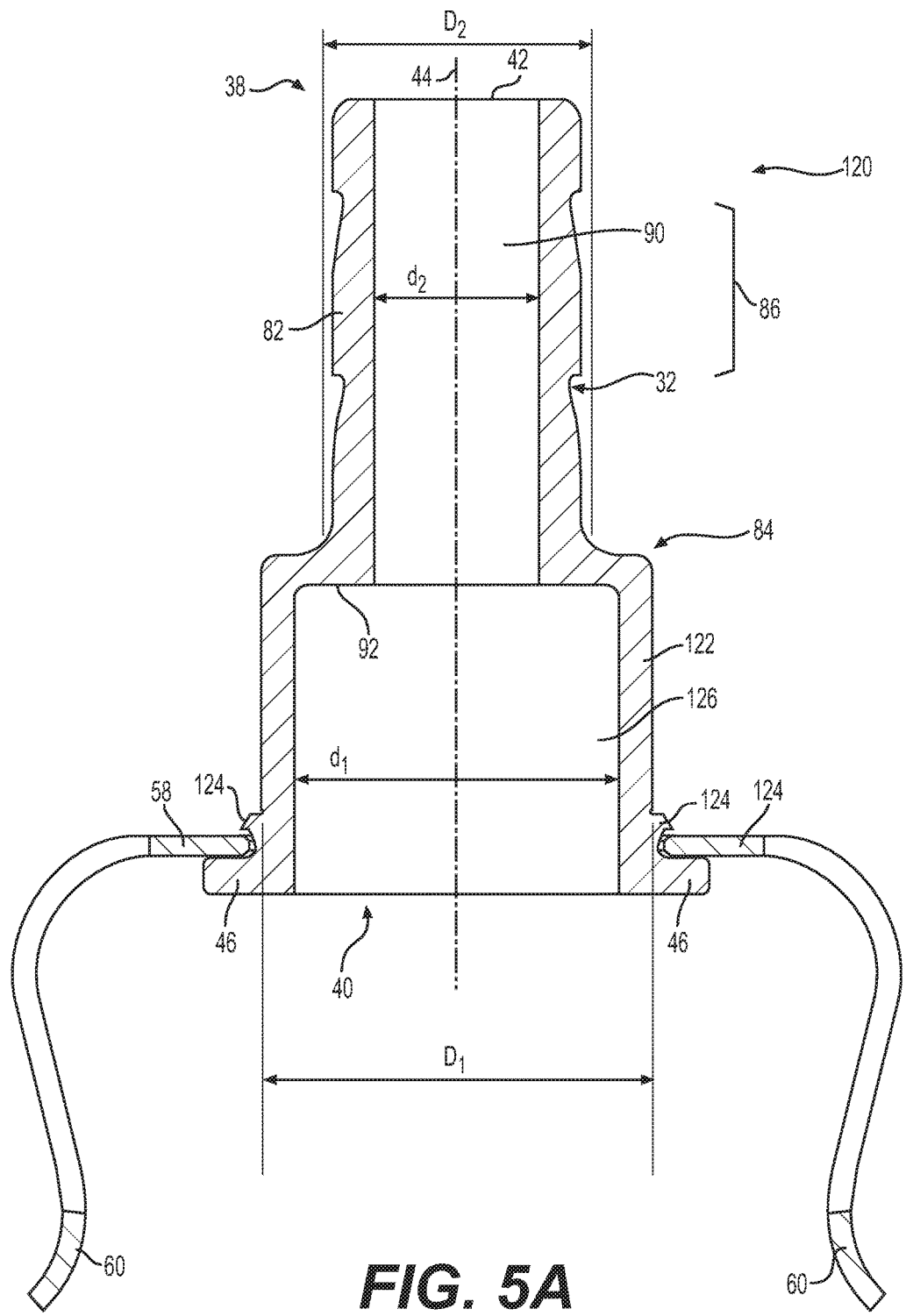
FIG. 5A is a cross-sectional view of the exemplary disclosed hose coupler assembly of FIG. 4.

FIG. 5A illustrates a cross-sectional view of an exemplary embodiment of hose coupler assembly 120 in a vertical plane passing through tabs 124. As illustrated in FIG. 5A, body portion 122 may have an outer diameter "$D_1$" larger than a maximum outer diameter "$D_2$" of barb portion 82. Coupler bore 42 may include body bore portion 126 and barb bore portion 90. Body bore portion 126 may extend from distal end 40 to adjacent body portion end 84 disposed between proximal end 38 and distal end 40. Barb bore portion 90 may extend from body bore portion 126 to proximal end 38. In one exemplary embodiment as illustrated in FIG. 5A, an inner diameter "$d_1$" of body bore portion 126 may be larger than an inner diameter "$d_2$" of barb bore portion 90, forming seating surface 92 adjacent body portion end 84. It is contemplated, however, that in some exemplary embodiments, inner diameters $d_1$ and $d_2$ may be equal, eliminating seating surface 92.

Figure 5B:
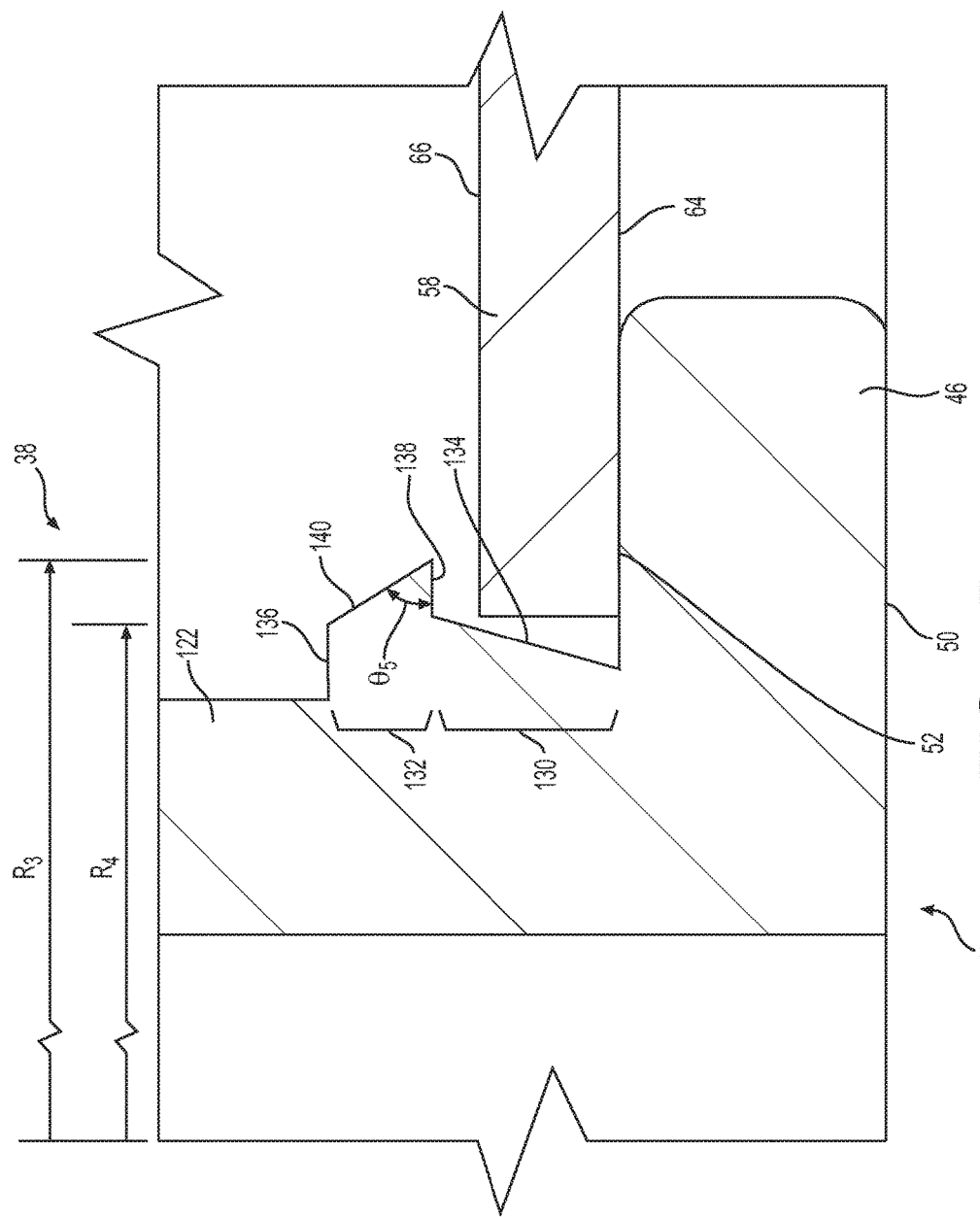
FIG. 5B is a magnified view of an exemplary disclosed tab of the hose coupler assembly of FIG. 4.

As also illustrated in FIG. 5A, tabs 124 may be disposed between body portion end 84 and distal end 40. Tabs 124 may be axially offset from flange 46 and may extend radially outward from body portion 122. Clip base 58 of clip 34 may be disposed between flange 46 and tabs 124. FIG. 5B illustrates a magnified cross-sectional view of tab 124. Tab 124 may include tab base 130 and tab projection 132. Tab base 130 may extend axially from flange rear face 52 towards proximal end 38 to tab projection 132. Tab base 130 may have a generally conical tab outer surface 134 with a radius increasing from adjacent flange rear face 52 towards tab projection 132.

Tab projection 132 may be attached to tab base 130 and may extend radially outward from body portion 122 of hose coupler assembly 120. Tab projection 132 may include outer surface 136, inner surface 138, and slanted surface 140. Inner surface 138 may be disposed opposite to and axially offset from outer surface 136. Inner surface 138 may also be disposed opposite to and axially offset from flange rear face 52. Outer surface 136 and inner surface 138 may be annular surfaces, which may be generally parallel to each other and to flange rear face 52. Outer surface 136 and inner surface 138 may also be disposed generally perpendicular to longitudinal axis 44. It is contemplated, however, that outer surface 136 and inner surface 138 may be inclined relative to both longitudinal axis 44 and flange rear face 52.

Slanted surface 140 may connect outer surface 136 and inner surface 138. Slanted surface 140 may have a generally convex shape relative to longitudinal axis 44 and may be inclined relative to both outer surface 136 and inner surface 138. In one exemplary embodiment, slanted surface 140 may have a radius "$R_3$" at tab base 130, which may be greater than a radius "$R_4$" of slanted surface 140 at outer surface 136. One of ordinary skill in the art would recognize that in the exemplary embodiment illustrated in FIG. 5B, radii $R_3$ and $R_4$ correspond to outer radii of inner surface 138 and outer surface 136, respectively. In another exemplary embodiment, an angle "$\theta_5$" between slanted surface 140 and inner surface 138 may range between about 60° and about 75°. The inclination of slanted surface 140 may help opening 62 of clip base 58 slide over slanted surface during assembly of clip 34 with hose coupler 32 of hose coupler assembly 120.

FIG. 6A illustrates another exemplary hose coupler assembly 160. Like hose coupler assembly 10, hose coupler assembly 160 may be attached to port 12 (see FIG. 1). Many of the components and features of hose coupler assembly 160 are similar to those already described with reference to hose coupler assemblies 30 and 120. In the following disclosure, only those components and/or features, which may be different from hose coupler assemblies 30 and 120, are described.

Hose coupler assembly 160 may include body portion 162 and barb portion 82. Body portion 162 may extend from distal end 40 to body portion end 84 disposed between proximal end 38 and distal end 40. Body portion 162 may have a generally cylindrical shape. Barb portion 82 may extend from body portion end 84 to proximal end 38. FIG. 6B illustrates a cross-sectional view of hose coupler assembly 160 in a vertical plane. As illustrated in FIG. 6B, body portion 162 may have an outer diameter "$D_1$" larger than a maximum outer diameter "$D_2$" of barb portion 82. Coupler bore 42 may include body bore portion 164 and barb bore portion 90. Body bore portion 164 may extend from distal end 40 to adjacent body portion end 84 disposed between proximal end 38 and distal end 40. Barb bore portion 90 may extend from body bore portion 164 to proximal end 38. In one exemplary embodiment as illustrated in FIG. 6B, an inner diameter "$d_1$" of body bore portion 164 may be larger than an inner diameter "$d_2$" of barb bore portion 90, forming seating surface 92 adjacent body portion end 84. It is contemplated, however, that in some exemplary embodiments, inner diameters $d_1$ and $d_2$ may be equal, eliminating seating surface 92. Unlike body portions 80, 122 of hose coupler assemblies 30, 120, respectively, body portion 162 and flange 46 of hose coupler assembly 160 may not include any tabs. Instead, flange rear face 52 may abut against base front face 64 of clip base 58.

INDUSTRIAL APPLICABILITY

The disclosed hose coupler assemblies 30, 120, and 160 may provide several advantages. For example, tabs 54, 56 of hose coupler assembly 30 may help ensure ease of assembly of clip 34 with hose coupler 32. In particular, during assembly of clip 34 with hose coupler 32, perimeter 48 of clip base 58 may engage with and slide along slanted surfaces 108. Tabs 54, 56 may deflect radially outward to allow clip 34 to be received between flange rear face 52 and projection inner surfaces 106 of tabs 54, 56. Tabs 54 and 56 may spring back to their un-deflected positions so that clip base 58 may be retained between flange rear face 52 and projection inner surfaces 106 of tabs 54, 56. In the assembled position, tab projections 96 of tabs 54 and 56 may prevent clip 34 from being disassembled from hose coupler 32. Likewise tab projections 96 of tabs 54, 56 may help ensure that hose coupler 32 does not disengage from clip 34.

Similarly, tabs 124 of hose coupler assembly 120 may help ensure ease of assembly of clip 34 with hose coupler 32. In particular, during assembly of clip 34 with hose coupler 32, opening 62 of clip base 58 may engage with and slide along slanted surface 140. Tab projections 132 of tabs 124 may deflect axially to allow clip 34 to be received between flange rear face 52 and inner surfaces 138 of tabs 124. Tabs 124 may spring back to their un-deflected positions so that clip base 58 may be retained between flange rear face 52 and inner surfaces 138 of tabs 124. In the assembled position, tab projections 132 of tabs 124 may prevent clip 34 from being disassembled from hose coupler 32. Likewise tab projections 132 of tabs 124 may help ensure that hose coupler 32 does not disengage from clip 34.

Hoses attached to barb portion 82 of hose coupler 32 often encounter tensile or pull forces because of pressure of the fluid flowing through the hoses or because of external mechanical forces applied to the hoses. Because flange 46 extends around an entire perimeter of body portions 80, 122, 162, the cross-sectional area at a base of flange 46, between flange 46 and body portion 80, may help decrease stresses generated in hose coupler 32 as a result of the pull forces on hose coupler 32. The lower stresses may help prevent breakage of flange 46 from body portion 80, which in turn may help to reduce a likelihood of disassembly of hose coupler 32 from port 12 during use of hose coupler assemblies 30, 120, 160. Additionally, allowing projections 18 of knob 16 to be received between clip base 58 and cross bars 74 of legs 60, may help reduce a likelihood of disengagement of clip 34 from knob 16, which in turn may help ensure that hose coupler 32 does not disengage from port 12 during use. Thus, by helping to minimize the risk of breakage of hose coupler 32 or disengagement of hose coupler 32 from port 12, hose coupler assemblies 30, 120, and 160 may help reduce a likelihood of fluid spills during transfer of fluids from tank 14 via port 12.

It will be apparent to those skilled in the art that various modifications and variations can be made to the disclosed hose coupler. Other embodiments will be apparent to those skilled in the art from consideration of the specification and practice of the disclosed hose coupler. It is intended that the specification and examples be considered as exemplary only, with a true scope being indicated by the following claims and their equivalents.

What is claimed is:

1. A hose coupler, comprising:
   a coupler body extending from a proximal end to a distal end, the coupler body includes a generally cylindrical body portion extending from the distal end to a body portion end disposed between the distal end and the proximal end and a barb portion extending from the body portion towards the proximal end;
   a coupler bore extending through a length of the coupler body;
   a flange disposed adjacent the distal end and extending radially from the coupler body; and
   at least a pair of tabs extending from the coupler body, the pair of tabs being disposed axially offset from the flange, wherein each tab of the pair of tabs includes a tab base extending axially from the flange towards the proximal end and a tab projection attached to the tab base and extending radially outward from the body portion, wherein the tab base has a generally conical tab outer surface, having a radius increasing from adjacent the flange to the tab projection.

2. The hose coupler of claim 1, wherein the tab projection includes:
   an annular inner surface disposed axially offset from a flange rear face;

an annular outer surface disposed opposite the inner surface and facing the proximal end; and a slanted surface extending between the inner surface and the outer surface, the slanted surface being generally inclined relative to the inner surface and the outer surface.

3. A hose coupler assembly, comprising:

a clip including an opening, wherein the clip includes a clip base including the opening and a pair of legs disposed diametrically opposite to each other, the legs extending from the clip base towards the distal end of the hose coupler, wherein the pair of legs of the clip are disposed in circumferential spaces between the pair of tabs;

a hose coupler disposed within the opening and extending from a proximal end to a distal end;

a coupler bore extending through a length of the hose coupler;

a flange disposed adjacent the distal end and extending radially from the hose coupler, the flange being configured to abut on the clip; and at least a pair of tabs extending from the flange towards the proximal end, the clip being disposed between the flange and the pair of tabs.

4. The hose coupler assembly of claim 3, wherein each of the pair of tabs includes:

a tab leg extending from the flange to a tab end disposed between the proximal end and the distal end; and a tab projection extending radially inward from the tab leg.

5. The hose coupler assembly of claim 4, wherein the tab projection includes:

a generally annular projection inner surface; and a slanted surface generally inclined relative to the projection inner surface.

6. The hose coupler assembly of claim 3, wherein each of the pair of legs includes:

a pair of spaced apart side bars extending from the clip base; and a cross bar connecting free ends of the pair of side bars; and a slot circumscribed by the clip base, the side bars, and the cross bar.

* * * * *